United States Patent
Tsonev et al.

(10) Patent No.: US 8,535,572 B2
(45) Date of Patent: Sep. 17, 2013

(54) POLYURETHANE GELS AND METHOD FOR THE PRODUCTION THEREOF

(75) Inventors: Tsvetomir Tsonev, Wildau (DE); Uwe Paulman, Küssaberg (DE); Gerhard Behrendt, Berlin (DE)

(73) Assignee: GT Elektrotechnische Produckte GmbH, Waldshut-Tiengen (DE)

( * ) Notice: Subject to any disclaimer, the term of this patent is extended or adjusted under 35 U.S.C. 154(b) by 0 days.

(21) Appl. No.: 12/995,517

(22) PCT Filed: Mar. 25, 2009

(86) PCT No.: PCT/EP2009/053517
§ 371 (c)(1),
(2), (4) Date: Dec. 1, 2010

(87) PCT Pub. No.: WO2010/108541
PCT Pub. Date: Sep. 30, 2010

(65) Prior Publication Data
US 2011/0140053 A1 Jun. 16, 2011

(51) Int. Cl.
*H01B 1/24* (2006.01)
*C08K 3/04* (2006.01)

(52) U.S. Cl.
USPC ........... 252/511; 524/590; 524/443; 524/442; 524/100; 524/101; 523/220; 523/500; 977/773; 977/788; 977/833

(58) Field of Classification Search
None
See application file for complete search history.

(56) References Cited

U.S. PATENT DOCUMENTS

| | | | | |
|---|---|---|---|---|
| 5,362,834 A | * | 11/1994 | Schapel et al. | 528/58 |
| 5,639,992 A | * | 6/1997 | Debbaut | 174/84 R |
| 5,849,824 A | * | 12/1998 | Mercer et al. | 524/297 |
| 2006/0161097 A1 | * | 7/2006 | Domb | 604/20 |
| 2007/0265384 A1 | * | 11/2007 | Ramotowski | 524/445 |
| 2008/0034614 A1 | * | 2/2008 | Fox et al. | 36/43 |

FOREIGN PATENT DOCUMENTS

| | | |
|---|---|---|
| DE | 10 2004 014165 A1 | 12/2004 |
| EP | 1 209 189 A1 | 5/2002 |
| WO | 96/00754 A1 | 1/1996 |
| WO | 2002/062863 A2 | 8/2002 |
| WO | 2006/008422 A1 | 1/2006 |

OTHER PUBLICATIONS

Kaolin industry data sheet, 1998-2011.*

* cited by examiner

*Primary Examiner* — Randy Gulakowski
*Assistant Examiner* — Jeffrey Washville
(74) *Attorney, Agent, or Firm* — Norris McLaughlin & Marcus PA

(57) ABSTRACT

Polyurethane gels are produced by converting a polyurethane system comprising (A1) one or more polyether alcohols of hydroxyl number 28 to 90 mg KOH/g produced primarily from propylene oxide added to a starter molecule of hydroxyl functionality between 2 and 4, (A2) one or more polyether alcohols of hydroxyl number 240 to 850 mg KOH/g produced primarily from propylene oxide added to a starter molecule of hydroxyl functionality between 2 and 4, (b1) one or more diisocyanates, (B2) one or more triisocyanates preferably produced by trimerisizing diisocyanates, (A3) at least one additive material fulfilling a prescribed function, and (A4) at least one additive material having a particle size in the range from 1 to 650 nm in the presence of one or more catalysts (A5) for forming polyurethane.

22 Claims, No Drawings

POLYURETHANE GELS AND METHOD FOR THE PRODUCTION THEREOF

This invention relates to polyurethane gels which, by means of specific composition and specific additives, can be adjusted to different kinds of functions in a multitude of fields of application, and to processes for production thereof.

Polyurethane gels are known. These are generally elastic polyurethanes having Shore A hardnesses in the range from 40 to 70, which are produced on the basis of polyethers with di- and/or polyisocyanates generally having an isocyanate index well below 100, in many cases even below 50. Such polyurethane gels are used, for example, in prosthetics, in the sports sector (bicycle saddles) and in cable feedthroughs.

According to the known prior art, polyurethane gels have been used, for example, in medical technology (pressure sores) or in the sports sector since the 1960s. These polyurethane gels are based on the combination of two polyether alcohols with different hydroxyl number—generally a typical trifunctional flexible foam polyol and a typical trifunctional or higher-functionality rigid foam polyether alcohol—in some cases also with polyoxypropylene glycols and di- or trifunctional isocyanates or mixtures with isocyanate indices below 50, i.e. with a considerable isocyanate deficiency. In individual examples, polyester alcohols are also used in place of the rigid foam polyether alcohols, and are generally standard products for coatings or elastomer production. According to FAPU 45, p. 5 (November 2007), polyurethane gels for electrical engineering have also been known for a short time, but not for electrical insulation, but rather as a seal for wall feedthroughs. These materials should adapt gently to each cable contour, even in the case of very small cable diameters. The material should also possess excellent cold flexibility and high movement compensation.

EP 0 057 838, for example, describes gel pads for the prevention of decubitus, consisting of a gel and a flexible, elastic casing, wherein the gel is composed of up to 62% of a high molecular weight matrix composed of covalently crosslinked polyurethane and up to 85% of a liquid dispersing agent bonded via secondary valencies. EP 0 511 570 describes improved gel compositions as reaction products of polyols and polyisocyanates, in which a polyol component consists of a plurality of polyols of hydroxyl number below 112, and those with hydroxyl numbers in the range from 112 to 600 mg KOH/g, and the isocyanate index of the mixture is in the range from 15 to 70. According to KR 1020060033464, the gels can be processed with two-component machines which are equipped with reservoir vessels at different temperatures. In addition, DE-C 199 57 397 describes polyurethane gels as composites with viscoelastic foams, in which the gel is produced from one or more polyols having hydroxyl numbers below 112 mg KOH/g and one or more polyols having hydroxyl numbers in the range from 112 to 600 mg KOH/g at a weight ratio of the components in the range from 90:10 to 10:90, and optionally known fillers and additives. According to the teaching of DE-A 100 16 539, the polyurethane gels may also be filled with expanding calcium carbonate in order to obtain a lower density. For application in shoes, it is possible to use polyurethane gels according to the teaching of EP 1 277 801 with phase change materials in fine distribution therein, which consist, for example, of crystalline saturated hydrocarbons.

According to the teaching of DE-A 10 2004 048 154, it is possible to seal two spaces from one another in a liquid-tight and gas-tight manner when the sealing body is in the form of a gel and an associated skin is formed. In addition, DE GM 20 2007 002 809 U1 describes a combination material formed from at least two materials, in which one material is a rubber material and the second is a gel, which enter into an intimate bond at a contact surface. According to DE-A 198 05 022, a further technical solution consists in sealing systems to seal built structures against weathering effects, which consist of hydrophilic polyurethane prepolymers and constituents which solidify under the influence of water.

According to the teaching of DE-A 196 18 825 A1, hydrophilic, self-adhesive polyurethane gel materials are produced from polyether polyols having 2 to 6 hydroxyl groups having hydroxyl numbers in the range from 20 to 112 mg KOH/g and an ethylene oxide content of more than 10%, antioxidants, bismuth(III) carboxylates soluble in the polyols as catalysts, and hexamethylene diisocyanate, where the product of the functionalities of the polyurethane-forming components should be at least 5.2.

The technical solutions to date describe in detail the production of polyurethane gels using a series of starting materials typical for polyurethane chemistry. However, no polyurethane gels having relatively high flame retardancy, resistance to relatively high electrical field strengths or insulation capacity with respect to medium voltages in electrical engineering have been described to date, and no technical solution for partial use or sole use of nanoparticle-containing polyether alcohols has been described or disclosed. In addition to the abovementioned functions of the polyurethane gels, apart from those described above in the prior art, none have become known either by virtue of the structure of the polymers used or by virtue of additives used.

It is an object of this invention to provide polyurethane gels having a series of functions in the form of a building block system, by virtue of a combination of polyurethane structure and additive, and also a process for production thereof.

The object is achieved by polyurethane gels producible by conversion of a polyurethane system comprising (A1) one or more polyether alcohols which have been prepared predominantly from propylene oxide added onto a starter molecule of hydroxyl functionality from 2 to 4 and have a hydroxyl number of 28 to 90 mg KOH/g, (A2) one or more polyether alcohols which have been prepared predominantly from propylene oxide added onto a starter molecule of hydroxyl functionality from 2 to 4 and have a hydroxyl number of 240 to 850 mg KOH/g, (B1) one or more diisocyanates, (B2) one or more triisocyanates which have preferably been prepared by trimerization of diisocyanates, (A3) at least one additive which fulfills a given function and (A4) at least one additive having a particle size in the range from 1 to 650 nm in the presence of one or more catalysts (A5) for polyurethane formation.

The process according to the invention for producing polyurethane gels is characterized in that (A1) a polyether alcohol of hydroxyl number 28 to 90 mg KOH/g composed of one or more, predominantly from onto a starter molecule of hydroxyl functionality from 2 to 4 added propylene oxide, (A2) a polyether alcohol of hydroxyl number 240 to 850 mg KOH/g composed of one or more, predominantly from onto a starter molecule of hydroxyl functionality from 2 to 4 added propylene oxide, (A5) one or more catalysts for polyurethane formation, (A3) at least one additive which fulfills a given function and (A4) at least one additive having a particle size in the range from 1 to 650 nm are mixed intimately with one another and then mixed with (B1) one or more diisocyanates, (B2) one or more triisocyanates which have preferably been prepared by trimerization of diisocyanates,
in a molar ratio of 1:0.5 to 1:1.2, and converted to a polyurethane gel having a Shore A hardness in the range from 35 to 85.

Advantageous developments are specified in the dependant claims.

One development of the polyurethane gels is characterized in that the polyether alcohol (A1) present is a polyether alcohol which has been grafted onto a di- to tetrafunctional starter exclusively with propylene oxide and has a hydroxyl number in the range of 44 to 90 mg KOH/g.

One configuration of the polyurethane gels envisages that the polyether alcohol (A1) present is an oligourea-containing long-chain polyether alcohol in which the oligoureas are obtained by depolymerization of flexible polyurethane slabstock foams by solvolysis with a mixture of at least one glycol and at least one secondary aliphatic amine, in an amount of 0.1 to 25% by weight, and has a particle diameter of 1 to 1000 μm.

An advantageous development of the polyurethane gels is characterized in that the polyether alcohol (A1) present is an oligourea-containing long-chain polyether alcohol in which the oligoureas are obtained by depolymerization of flexible polyurethane slabstock foams by solvolysis with a mixture of at least two glycols and at least one secondary aliphatic amine, in an amount of 0.1 to 15% by weight, and has a particle diameter of 1 to 1000 nm.

One configuration of the polyurethane gels envisages that the polyether alcohol (A2) present is a polyether alcohol which has been grafted onto a di- to tetrafunctional starter exclusively with propylene oxide and has a hydroxyl number in the range of 350 to 480 mg KOH/g.

An advantageous development of the polyurethane gels is characterized in that the polyether alcohol (A2) present is a polyether alcohol which has been grafted onto a di- to tetrafunctional starter exclusively with propylene oxide and polyether ester which has been reacted with an aliphatic dicarboxylic acid in deficiency, and has a hydroxyl number in the range of 340 to 420 mg KOH/g.

One configuration of the polyurethane gels is characterized in that the triisocyanate (B2) present is a partly trimerized mixture of aliphatic, araliphatic and/or cycloaliphatic, and at least one aromatic, diisocyanate.

In one development of the polyurethane gels, the aromatic diisocyanate (B2) is present in the mixture at 1 to 15% by weight.

One configuration of the polyurethane gels envisages that the catalysts (A5) present are bis(dinnethylanninoethyl) ether, pentamethyldiethylenetriamine, dimorpholinodiethyl ether, tris(3-dimethylamino)propylamine, pentamethylpropylenetriamine, N-methyldicyclohexylamine, N-methylmorpholine, N,N'-dimethylpiperazine and/or 1-dimethylanninoethyl-4-methylpiperazine.

An advantageous configuration of the polyurethane gels envisages that the polyurethane system comprises
(A1.1) 40 to 60 parts of a polyether alcohol which has been prepared predominantly from propylene oxide added onto a starter molecule of hydroxyl functionality from 2 to 4 and has a hydroxyl number of 44 to 90 mg KOH/g,
(A2.1) 30 to 15 parts of a polyether alcohol which has been prepared predominantly from propylene oxide added onto a starter molecule of hydroxyl functionality from 2 to 4 and has a hydroxyl number of 320 to 450 mg KOH/g,
(B1.1) 25 to 42 parts of one or more diisocyanates,
(B2.1) 5 to 15 parts of a triisocyanate prepared preferably by trimerization of diisocyanates,
(A5.1) 0.001 to 0.5 part of one or more catalysts for polyurethane formation,
and additionally comprises
(A3.1) 0.1 to 15 parts of a substance which improves thermal conductivity in micronized form, preferably silicon carbide or graphite having particle diameters in the range from 0.1 to 500 μm, and
(A4.1) 0.01 to 5 parts of a nanoscale sheet silicate having a particle size in the range from 50 to 650 nm.

A further development of the polyurethane gels is characterized in that the polyurethane system comprises
(A1.1) 40 to 60 parts of a polyether alcohol which has been prepared predominantly from propylene oxide added onto a starter molecule of hydroxyl functionality from 2 to 4 and has a hydroxyl number of 44 to 90 mg KOH/g,
(A2.1) 30 to 15 parts of a polyether alcohol which has been prepared predominantly from propylene oxide added onto a starter molecule of hydroxyl functionality from 2 to 4 and has a hydroxyl number of 320 to 450 mg KOH/g,
(B1.1) 25 to 42 parts of one or more diisocyanates,
(B2.1) 5 to 15 parts of a triisocyanate prepared preferably by trimerization of diisocyanates,
(A5.1) 0.001 to 0.5 part of one or more catalysts for polyurethane formation,
and additionally comprises
(A3.2) 0.1 to 15 parts of a substance which improves electrical conductivity in micronized form, preferably iodine-treated carbon, graphite or molybdenum sulfide having particle diameters in the range from 0.1 to 500 μm, and
(A4.1) 0.01 to 5 parts of a nanoscale sheet silicate having a particle size in the range from 50 to 650 nm.

One configuration of the polyurethane gels envisages that the polyurethane system comprises
(A1.1) 40 to 60 parts of a polyether alcohol which has been prepared predominantly from propylene oxide added onto a starter molecule of hydroxyl functionality from 2 to 4 and has a hydroxyl number of 44 to 90 mg KOH/g,
(A2.1) 30 to 15 parts of a polyether alcohol which has been prepared predominantly from propylene oxide added onto a starter molecule of hydroxyl functionality from 2 to 4 and has a hydroxyl number of 320 to 450 mg KOH/g,
(B1.1) 25 to 42 parts of one or more diisocyanates,
(B2.1) 5 to 15 parts of a triisocyanate prepared preferably by trimerization of diisocyanates,
(A5.1) 0.001 to 0.5 part of one or more catalysts for polyurethane formation,
and additionally comprises
(A3.3) 1 to 15 parts of a liquid, pasty or gel-type, relatively high molecular weight hydrocarbon with high electrical insulation capacity, preferably a mineral oil or Vaseline, and
(A4.1) 0.01 to 5 parts of a nanoscale sheet silicate having a particle size in the range from 50 to 650 nm.

One configuration of the inventive polyurethane gels is characterized in that the polyurethane system comprises
(A1.1) 40 to 60 parts of a polyether alcohol which has been prepared predominantly from propylene oxide added onto a starter molecule of hydroxyl functionality from 2 to 4 and has a hydroxyl number of 44 to 90 mg KOH/g,
(A2.1) 30 to 15 parts of a polyether alcohol which has been prepared predominantly from propylene oxide added onto a starter molecule of hydroxyl functionality from 2 to 4 and has a hydroxyl number of 320 to 450 mg KOH/g,
(B1.1) 25 to 42 parts of one or more diisocyanates,
(B2.1) 5 to 15 parts of a triisocyanate prepared preferably by trimerization of diisocyanates, (A5.1) 0.001 to 0.5 part of one or more catalysts for polyurethane formation,
and additionally comprises
(A3.4) 2.5 to 15 parts of a substance which improves flame retardancy in micronized form, preferably melamine, melamine cyanurate, melamine-formaldehyde resin, urea-formaldehyde resin and/or polycyanurate resin having particle diameters in the range from 0.1 to 500 µm, and
(A4.1) 0.01 to 5 parts of a nanoscale sheet silicate having a particle size in the range from 50 to 650 nm.

An advantageous development of the polyurethane gels is characterized in that the polyurethane system comprises (A1.1) 40 to 60 parts of a polyether alcohol which has been prepared predominantly from propylene oxide added onto a starter molecule of hydroxyl functionality from 2 to 4 and has a hydroxyl number of 44 to 90 mg KOH/g,
(A2.1) 30 to 15 parts of a polyether alcohol which has been prepared predominantly from propylene oxide added onto a starter molecule of hydroxyl functionality from 2 to 4 and has a hydroxyl number of 320 to 450 mg KOH/g,
(A6) 3 to 18 parts of an aliphatic-aromatic polyester alcohol of hydroxyl number 180 to 320 mg KOH/g with aromatics content 2 to 23% by weight,
(B1.1) 25 to 42 parts of one or more diisocyanates,
(B2.1) 5 to 15 parts of a triisocyanate prepared preferably by trimerization of diisocyanates,
(A5.1) 0.001 to 0.5 part of one or more catalysts for polyurethane formation,
and additionally comprises
(A3.5) 0.1 to 5 parts of a modified native oil and
(A4.1) 0.01 to 5 parts of a nanoscale sheet silicate having a particle size in the range from 50 to 650 nm.

One configuration of the inventive polyurethane gels is characterized in that the polyurethane system comprises (A1.2) 40 to 60 parts of a polyether alcohol which has been prepared predominantly from propylene oxide added onto a starter molecule of hydroxyl functionality from 2 to 4 and has a hydroxyl number of 44 to 90 mg KOH/g with in the range from 2 to 15% by weight of dispersed oligoureas of particle size 10 to 1000 µm,
(A2.2) 25 to 10 parts of a polyether alcohol which has been prepared predominantly from propylene oxide added onto a starter molecule of hydroxyl functionality from 2 to 4 and has a hydroxyl number of 320 to 450 mg KOH/g,
(B1.1) 25 to 42 parts of one or more diisocyanates,
(B2.1) 5 to 15 parts of a triisocyanate prepared preferably by trimerization of diisocyanates,
(A5.1) 0.001 to 0.5 part of one or more catalysts for polyurethane formation,
and additionally comprises
(A3.5) 0.1 to 5 parts of a modified native oil and
(A4.1) 0.01 to 5 parts of a nanoscale sheet silicate having a particle size in the range from 50 to 650 nm.

One development of the polyurethane gels envisages that the polyurethane system comprises (A1.2) 40 to 60 parts of a polyether alcohol which has been prepared predominantly from propylene oxide added onto a starter molecule of hydroxyl functionality from 2 to 4 and has a hydroxyl number of 44 to 90 mg KOH/g with in the range from 2 to 15% by weight of dispersed oligoureas of particle size 10 to 1000 nm,
(A2.2) 25 to 10 parts of a polyether alcohol which has been prepared predominantly from propylene oxide added onto a starter molecule of hydroxyl functionality from 2 to 4 and has a hydroxyl number of 320 to 450 mg KOH/g,
(B1.1) 25 to 42 parts of one or more diisocyanates,
(B2.2) 2.5 to 10 parts of a triisocyanate prepared preferably by trimerization of diisocyanates,
(A5.1) 0.001 to 0.5 part of one or more catalysts for polyurethane formation,
and additionally comprises
(A4.1) 0.01 to 5 parts of a nanoscale sheet silicate having a particle size in the range from 50 to 650 nm.

One configuration of the process according to the invention is characterized in that the polyether alcohol (A1) used is an oligourea-containing long-chain polyether alcohol in which the oligoureas are obtained by depolymerization of flexible polyurethane slabstock foams by solvolysis with a mixture of at least one glycol and at least one secondary aliphatic amine, are present in an amount of 0.1 to 25% by weight, and have a particle diameter of 1 to 1000 µm.

One development of the process envisages that (A1.1) 40 to 60 parts of a polyether alcohol which has been prepared predominantly from propylene oxide added onto a starter molecule of hydroxyl functionality from 2 to 4 and has a hydroxyl number of 44 to 90 mg KOH/g,
(A2.1) 30 to 15 parts of a polyether alcohol which has been prepared predominantly from propylene oxide added onto a starter molecule of hydroxyl functionality from 2 to 4 and has a hydroxyl number of 320 to 450 mg KOH/g,
(A5.1) 0.001 to 0.5 part of one or more catalysts for polyurethane formation,
(A3.1) 0.1 to 15 parts of a substance which improves thermal conductivity in micronized form, preferably silicon carbide, graphite or molybdenum sulfide having particle diameters in the range from 0.1 to 500 µm, and
(A4.1) 0.01 to 5 parts of a nanoscale sheet silicate having a particle size in the range from 50 to 650 nm
are mixed intimately, and the following are added to this mixture:
(B1.1) 25 to 42 parts of one or more diisocyanates,
(B2.1) 5 to 15 parts of a triisocyanate prepared preferably by trimerization of diisocyanates,
and this mixture in turn is mixed intimately, subjected to shaping and cured while being shaped.

One configuration of the process according to the invention is characterized in that (A1.1) 40 to 60 parts of a polyether alcohol which has been prepared predominantly from propylene oxide added onto a starter molecule of hydroxyl functionality from 2 to 4 and has a hydroxyl number of 44 to 90 mg KOH/g,
(A2.1) 30 to 15 parts of a polyether alcohol which has been prepared predominantly from propylene oxide added onto a starter molecule of hydroxyl functionality from 2 to 4 and has a hydroxyl number of 320 to 450 ring KOH/g,
(A5.1) 0.001 to 0.5 part of one or more catalysts for polyurethane formation,
(A3.2) 0.1 to 15 parts of a substance which improves electrical conductivity in micronized form, preferably iodine-treated carbon, graphite or molybdenum sulfide having particle diameters in the range from 0.1 to 500 µm, and
(A4.1) 0.01 to 5 parts of a nanoscale sheet silicate having a particle size in the range from 50 to 650 nm
are mixed intimately, and the following are added to this mixture:
(B1.1) 25 to 42 parts of one or more diisocyanates,
(B2.1) 5 to 15 parts of a triisocyanate prepared preferably by trimerization of diisocyanates,
and this mixture in turn is mixed intimately, subjected to shaping and cured while being shaped.

One development of the process envisages that (A1.1) 40 to 60 parts of a polyether alcohol which has been prepared predominantly from propylene oxide added onto a starter molecule of hydroxyl functionality from 2 to 4 and has a hydroxyl number of 44 to 90 mg KOH/g, (A2.1) 30 to 15 parts of a polyether alcohol which has been prepared predominantly from propylene oxide added onto a starter molecule of hydroxyl functionality from 2 to 4 and has a hydroxyl number of 320 to 450 mg KOH/g, (A5.1) 0.001 to 0.5 part of one or more catalysts for polyurethane formation, (A3.3) 2.5 to 15 parts of a substance which improves flame retardancy in micronized form, preferably melamine, melamine cyanurate, melamine-formaldehyde resin, urea-formaldehyde resin and/or polycyanurate resin having particle diameters in the range from 0.1 to 500 μm, and (A4.1) 0.01 to 5 parts of a nanoscale sheet silicate having a particle size in the range from 50 to 650 nm are mixed intimately, and the following are added to this mixture:

(B1.1) 25 to 42 parts of one or more diisocyanates, (B2.1) 5 to 15 parts of a triisocyanate prepared preferably by trimerization of diisocyanates, and this mixture in turn is mixed intimately, subjected to shaping and cured while being shaped.

An advantageous configuration of the process is characterized in that (A1.1) 40 to 60 parts of a polyether alcohol which has been prepared predominantly from propylene oxide added onto a starter molecule of hydroxyl functionality from 2 to 4 and has a hydroxyl number of 44 to 90 mg KOH/g, (A2.1) 30 to 15 parts of a polyether alcohol which has been prepared predominantly from propylene oxide added onto a starter molecule of hydroxyl functionality from 2 to 4 and has a hydroxyl number of 320 to 450 mg KOH/g, (A5.1) 0.001 to 0.5 part of one or more catalysts for polyurethane formation, (A6) 3 to 18 parts of an aliphatic-aromatic polyester alcohol of hydroxyl number 180 to 320 mg KOH/g with aromatics content 2 to 23% by weight, and (A4.1) 0.1 to 5 parts of a nanoscale sheet silicate having a particle size in the range from 50 to 650 nm are mixed intimately, and the following are added to this mixture:

(B1.1) 25 to 42 parts of one or more diisocyanates, (B2.1) 5 to 15 parts of a triisocyanate prepared preferably by trimerization of diisocyanates, and this mixture in turn is mixed intimately, subjected to shaping and cured while being shaped.

In one development of the process (A1.1) 40 to 60 parts of a polyether alcohol which has been prepared predominantly from propylene oxide added onto a starter molecule of hydroxyl functionality from 2 and 4 and has a hydroxyl number of 44 to 90 mg KOH/g, (A2.1) 30 to 15 parts of a polyether alcohol which has been prepared predominantly from propylene oxide added onto a starter molecule of hydroxyl functionality from 2 and 4 and has a hydroxyl number of 320 to 450 mg KOH/g, (A5.1) 0.001 to 0.5 part of one or more catalysts for polyurethane formation, (A3.5) 0.1 to 5 parts of a modified native oil and (A4.1) 0.01 to 5 parts of a nanoscale sheet silicate having a particle size in the range from 50 to 650 nm are mixed intimately, and the following are added to this mixture:

(B1.1) 25 to 42 parts of one or more diisocyanates, (B2.1) 5 to 15 parts of a triisocyanate prepared preferably by trimerization of diisocyanates, and this mixture in turn is mixed intimately, subjected to shaping and cured while being shaped.

One configuration of the process is characterized in that (A1.2) 40 to 60 parts of a polyether alcohol which has been prepared predominantly from propylene oxide added onto a starter molecule of hydroxyl functionality from 2 and 4 and has a hydroxyl number of 44 to 90 mg KOH/g with in the range from 2 to 15% by weight of dispersed oligoureas of particle size 10 to 1000 nm, (A2.2) 25 to 10 parts of a polyether alcohol which has been prepared predominantly from propylene oxide added onto a starter molecule of hydroxyl functionality from 2 and 4 and has a hydroxyl number of 320 to 450 mg KOH/g, (A5.1) 0.001 to 0.5 part of one or more catalysts for polyurethane formation, (A4.1) 0.01 to 5 parts of a nanoscale sheet silicate having a particle size in the range from 50 to 650 nm are mixed intimately, and the following are added to this mixture:

(B1.1) 25 to 42 parts of one or more diisocyanates, (B2.1) 5 to 15 parts of a triisocyanate prepared preferably by trimerization of diisocyanates, and this mixture in turn is mixed intimately, subjected to shaping and cured while being shaped.

The inventive polyurethane gels are based on a network which is crosslinked both in the soft segment phase and in the hard segment phase, and additionally consists, in the soft segment phase composed of two networks of significantly different network chain separation (characterized by the mean molar mass between the network nodes), of a polyether alcohol mixture of essentially homogeneous composition containing the more hydrophobic propylene glycol structural element, and crosslinking in the hard segment via triisocyanates. In this context, the triisocyanates are first formed from mixtures of aliphatic, cycloaliphatic and/or araliphatic diisocyanates and at least one aromatic diisocyanate in the presence of particular catalysts, the proportion of aromatic diisocyanates determining the degree of trimerization of the isocyanate mixture and hence the degree of crosslinking (crosslinking density) in the hard segment.

The ratio of the polyether alcohol (A1) to the polyether alcohol (A2) determines the hardness and elasticity of the polyurethane gel. According to the invention, this ratio between (A1):(A2) is 97:3 to 65:35. In order to achieve a hardness, for example, of 80 Shore A, a ratio of (A1) to (A2) of 72:28 is required. In order to achieve a hardness, for example, of 35 Shore A, a ratio of (A1) to (A2) of 93:7 is required. It is also observed that, as hardness decreases, irrespective of the stoichiometry of the reaction with the di- and/or triisocyanate and hence a rising proportion of polyether alcohol (A1) and rising proportion of triisocyanate, the band strength desired for the polyurethane gels rises and hence the ratio of the polyether alcohols relative to one another and the proportion of trifunctional isocyanates can be controlled.

The stoichiometric ratio of hydroxyl groups to isocyanate groups, which according to the prior art should be 0.5 or lower, may also be much higher and even more than 1 by virtue of the inventive mode of operation, which is of significance in the case of polyurethane gels for electrical engineering owing to the required surface resistivity and the breakdown voltage required for the medium-voltage sector, since the free hydroxyl groups make a significant contribution to the conductivity of the material.

Useful catalysts (A5) for production of the gels are primarily particular tertiary amines, for example bis(dimethylaminoethyl) ether, pentamethyldiethylenetriamine, dimorpholinodiethyl ether, tris(3-dimethylamino)propylamine, pentamethylpropylenetriamine, N-methyldicyclohexylamine, N-methylmorpholine, N,N'-dimethylpiperazine, 1-dimethylaminoethyl-4-methylpiperazine. Secondly, it is also possible to use organometallic compounds, for example bismuth or lead compounds such as the carboxylates, e.g. bismuth triacetate, bismuth trioleate, bismuth subsalicylate or bismuth bisneodecanoate, and also specific tin compounds, especially those which are thermally activatable, e.g. dibutyltin bis(2-ethylhexylthioglycolate). These catalysts are used in amounts between 0.0001 and 1% by weight based on the polyether alcohol mixture.

Partly trimerized diisocyanates (B2) with an adjustable degree of trimerization are prepared in mixtures of aliphatic, cycloaliphatic and/or araliphatic diisocyanates, and at least one aromatic diisocyanate. The amount of aromatic di- and/or polyisocyanate used determines, in addition to the amount of catalyst, the degree of trimerization. According to the invention, the ratio of aliphatic, cycloaliphatic and/or araliphatic diisocyanates and aromatic di- and/or polyisocyanate should be in the range from 98:2 to 80:20. The trimerization is effected by addition of 0.001 to 0.5% by weight of a particular compound, or combination of compounds, which catalyzes the trimerization of isocyanates. For the preparation of these partial trimerizates, especially known catalysts such as tris(2,4,6-dimethylmethyl)phenol, tris-1,3,5-(dimethylaminopropyl)hexahydro-s-triazine, tris-1,3,5-(diethylaminopropyl)hexahydro-s-triazine, tris-1,3,5-(diethylaminobutyl)hexahydro-s-triazine, combinations of triethylenediamine and epoxides are used. The ratio of the aliphatic, cycloaliphatic and/or araliphatic diisocyanates to the aromatic diisocyanate determines the degree of trimerization, and the lightfastness (UV stability) of the partial trimerizates. In general, only a low proportion in the range from 1 to 20 parts aromatic diisocyanate is used in the mixture, particular preference being given to a proportion of 3 to 12% by weight. For example, 89 parts 4,4'-dicyclohexylmethane diisocyanate and 11% 2,4-tolylene diisocyanate, in the presence of 0.15% by weight of tris-1,3,5-(diethylaminopropyl)hexahydro-s-triazine, can be used to prepare such a partial trimerizate having an isocyanate content of 14.3% and a viscosity of 4870 mPas (25° C.).

By virtue of the use of different formulations, it is possible to prepare polyurethane gels with particular functions. The different formulations can be inferred from the particular configurations of the invention in the preceding part.

A polyurethane gel with good thermal conductivity, which is required, for example, in the case of use in the medical or sports sector, is produced by addition of substances which improve thermal conductivity in micronized form. It is appropriate to add these additives to the polyurethane system before the B component is mixed with the overall system.

A further function of the polyurethane gels is good electrical conductivity, as required, for example, in conductive tapes in pipes for data transfer, or in vehicles for dissipation of static electricity.

A further advantageous function of the inventive polyurethane gels is, for example, improved flame retardancy. For instance, for cable potting compositions on ships or in mines, combustibility complying with DIN 4102 class B1 is required. With polymers such as polyurethanes, this can typically be achieved only by using liquid or solid halogen- and phosphorus-containing flame retardants in addition to a trimerization of a multitude of isocyanate groups. Inventive flame-retardant polyurethane gels can achieve a classification into DIN 4102 class B1 when solid micronized nitrogen-containing compounds or polymers are added thereto.

A further inventive function of the polyurethane gels is improved adhesion to other materials, for example to polymers, metals, nonmetals, ceramics and glass. Noteworthy among the inventive polyurethane gels are those which are produced using oligourea-containing long-chain polyether alcohols. Polyurethane gels produced in such a way are not known to date and constitute a preferred embodiment of the invention. The oligourea-containing long-chain polyether alcohols in turn are prepared by depolymerization of flexible polyurethane slabstock foams by solvolysis with a mixture of at least one glycol and at least one secondary aliphatic amine. The conditions selected are those which lead to a dispersion polyol with a particle diameter of the oligoureas in the range from 1 to 1000 μm, or to a nanoparticle-containing, clear polyol having a particle diameter of the oligoureas in the range from 50 to 1000 nm.

Also producible are polyurethane gels with thixotropic properties, which find use, for example, as lubricant gel.

Polyurethane gels with relatively high elasticity are produced by using polyether alcohols with nanoscale oligoureas. This reduces the proportion of the trifunctional isocyanates slightly. A polyurethane gel with improved elasticity, which can be used, for example, in the sports sector as a damping gel, has been described in detail above.

Also noteworthy among the inventive polyurethane gels are those which are produced using 1 to 25% by weight, based on the polyol component, of lightly branched aromatic polyester alcohols based on aromatic dicarboxylic acids such as terephthalic acid, phthalic acid or isophthalic acid, and in the range from 0.1 to 25% by weight of glycerol and one or more glycols. Typically, mixtures of polyether alcohols and polyester alcohols are unstable and separate only a short time after the mixing. By virtue of the specific structure of the branched aromatic polyester alcohols which have, as structural components in addition to the aromatic dicarboxylic acid and a glycol, an aliphatic dicarboxylic acid and a diol having one secondary and one primary hydroxyl group, it is possible to obtain stable mixtures with the polyether alcohols, which lead further to homogeneous polyurethane gels. By virtue of the use of such branched aromatic polyester alcohols in amounts of 1 to 25% by weight, it is possible to achieve the hardness to a desired higher value and also improved bond strength of the gels.

The novel polyurethane gels are notable for properties adjusted precisely to the specific application. These can be achieved by virtue of the inventive combination of the structure of the base polyurethanes and the additives dispersed or distributed or incorporated therein. An essential criterion of the process according to the invention is that essential propylene oxide-based polyethers with zero or not more than 5% by weight of ethylene oxide are used and the stoichiometry of the hydroxyl-isocyanate reaction is essentially balanced and only in particular cases in which extreme softness of the gels is required are substoichiometric ratios down to the region of 0.6 employed.

The production of the inventive gels follows essentially the procedure customary in polyurethane chemistry, that a premixture (component) is produced from the hydroxyl compounds, the catalysts and the additives, which is mixed intimately with the isocyanate(s), optionally transferred to a mold and cured therein to the desired degree.

By virtue of the ratio of the polyethers to one another and the ratio thereof to the isocyanates is adjusted such that the ratio of the hydroxyl groups to the isocyanate groups is in the molar ratio of 1:0.5 to 1:1.2, and the Shore A hardness of the inventive polyurethane gels is in the range from 35 to 85.

A particular embodiment of the invention relates to polyurethane gels with extremely low hardness. These are produced exclusively from a combination of short- and long-chain diols and triisocyanates, optionally in a mixture with diisocyanates and further additives and/or fillers. These gels are specifically produced from
- one or more polypropylene glycols of molar mass 800 to 3000,
- dipropylene glycol,
- catalysts, preferably thermally sensitive tin catalysts,
- partly trimerized aromatic and/or cycloaliphatic diisocyanates,
- optionally fillers, pigments, oils or solid flame retardants.

More particularly, these gels are produced from
- 1 hydroxyl equivalent of polypropylene glycol 2000,
- 1 to 8 hydroxyl equivalents of dipropylene glycol,
- 2 to 9 isocyanate equivalents of a partly trimerized 4,4'-diphenylmethane diisocyanate or a partly trimerized mixture of 4,4'-diphenylmethane diisocyanate and 4,4'-dicyclohexylmethane diisocyanate in a ratio of 0.1:1 to 1:0.1 with an isocyanate functionality of 2.2 to 2.9
- 0.01 to 1.5% by weight, based on the total mass arising from the hydroxyl equivalents, of thiosulfur catalysts, especially of the dibutyltin bis(thioglycolate) type,
- nanoscale active, reactive or inert fillers, such as amino-containing oligoureas, polyureas, melamine derivatives and/or sheet silicates of the montmorillonite type, or carbides such as silicon carbide.

The gels produced thereby have a Shore 00 hardness in the range from 30 to 65, and can also be obtained in situ under the conditions of production at the site of use.

In a further embodiment of the invention, oils can be added to the gels to reduce hardness and to improve electrical properties. The oils used may accordingly be native oils, for example linseed oil, rapeseed oil, coconut oil, soybean oil, colza oil, rapeseed oil, grapeseed oil or pumpkinseed oil, and the reaction products and stabilization products thereof having viscosities above 250 mPas (25° C.), and mineral oils of high stability, primarily turbine or transformer oils.

Modified native oils refer to those products which are obtained by some kind of chemical reaction with a native oil. These include transesterification products, which are obtained, for example, by a reaction of the native oil with an alcohol, a diol, a triol, with a mono- or polycarboxylic acid, a polyester alcohol, a polyether alcohol, or by hydration with water, in the presence of suitable catalysts or further reagents. More particularly, this refers to products which are converted by transesterification on the ester groups of the oils (triglycerides) by means of compounds containing hydroxyl groups, for example monoalcohols, glycols or triols, and of oligomers, for example oligoester alcohols, polyester alcohols, oligoether alcohols, polyether alcohols of hydroxyl functionality 2 to 5, or mono-, di- or tricarboxylic acids. A particular group is that of the hydroxylated native oils, which are obtained, for example, by a hydration with water in the presence of acidic salts or by reaction with peroxides or peracids, in particular performic acid or peracetic acid, optionally in the presence of catalysts.

One example is the reaction of soybean oil with formic acid and hydrogen peroxide, by which the hydroxyl functionality of the soybean oil is increased to values of 2 to 3.5, and the reaction product can be alkoxylated further. This affords polyester ether alcohols of molar mass up to 6000. Another option is reaction of the native oils, for example of rapeseed oil, with oligoester condensates as described in DE-A 199 18 650, and which leads to reaction products having hydroxyl numbers of 100 to 400 mg KOH/g.

A further option is the functionalization of the native oils via hydration of double bonds by addition of water. This hydration can be effected, for example, in the presence of potassium hydrogensulfate or hydrogenphosphate. The addition of water onto the double bonds, for example in the case of linseed oil, olive oil or coconut oil, can increase the number of hydroxyl groups available and hence the hydroxyl functionality to values up to more than 4.

In a further modification, the native oils can be converted by means of long-chain fatty acids with no double bonds, for example with 24 carbon atoms, which forms waxy products. These transesterifications are preferably performed in the presence of transition metal acetates or bromides, for example cobalt acetate. The carboxylic acid released is removed either by direct extraction or by formation of salts and subsequent extraction with water or aqueous solutions.

The polyester alcohols are prepared on the basis either of aromatic or of aliphatic dicarboxylic acids in the presence of additives. The aromatic-aliphatic polyester alcohols consist of
- at least one aromatic dicarboxylic acid at 5 to 45%,
- at least one aliphatic dicarboxylic acid at 3 to 22%,
- one or more diols in the range from 30 to 72% and
- one or more triols in the range from 0.1 to 12%, where the aliphatic and aromatic dicarboxylic acids are distributed randomly in the chain via one or more diols, and the triol(s) is/are distributed randomly in the chain only via the primary hydroxyl groups. In addition, these polyester alcohols have a molar mass of $M_n$ 250 to 750, and a calculated functionality $f_n$ in the range from 2.00 to 2.8, where the hydroxyl numbers should be in the range from 180 to 350 mg KOH/g.

Aromatic dicarboxylic acids are preferably terephthalic acid, isophthalic acid or phthalic acid, or mixtures thereof. The aliphatic dicarboxylic acids used are preferably adipic acid, succinic acid, azelaic acid, undecanedioic acid or mixtures thereof. Diols are preferably diethylene glycol, triethylene glycol, tetraethylene glycol, higher polyethylene glycols or mixtures thereof. Triols are preferably glycerol, 1,3,6-hexanetriol, 1,2,6-hexanetriol, 1,3,8-octanetriol or mixtures thereof.

The aromatic content is calculated from the content of the aromatic dicarboxylic acids. To calculate the aromatic content, the aromatic is set at a molar mass of 76 ($C_6H_4$). In the aromatic dicarboxylic acids mentioned, this would be an aromatic content of 45.78% (aromatic molar mass 76 divided by the molar mass of the acid 166). The proportion of the aromatic dicarboxylic acid in the reaction mixture is then multiplied with this percentage, taking account of the reaction products which are formed and distilled off with a reduction in the abovementioned percentage to 42%. With 5% aromatic dicarboxylic acid, this gives an aromatic content of 2.1%, and with 45% aromatic dicarboxylic acid an aromatic content of 18.9%. The range described here is thus covered fully.

The invention is illustrated in detail by the working examples which follow.

EXAMPLE 1

A polyurethane gel is produced from a mixture of 95.85 g of a polyether alcohol of molar mass 3000 based on glycerol and propylene oxide, hydroxyl number 55.5 mg KOH/g, from 39.15 g of a polyether alcohol of molar mass 420 based on glycerol and propylene oxide, hydroxyl number 402 mg KOH/g, 0.48 g of N-methyldicyclohexylamine, which are first premixed at 25° C. for 30 minutes, and a partly trimerized isocyanate which has been prepared from 116.7 g of 4,4'- dicyclohexylmethyl diisocyanate and 8.7 g of 2,4-tolylene diisocyanate in the presence of 0.175 g of tris-1,3,5-(diethylaminopropyl)hexahydro-s-triazine, by mixing by means of a 2-component low-pressure machine and casting in molds. The polyurethane gel obtained has a Shore A hardness of 76, a breakdown voltage of 65 kV/mm and very good adhesion between the surfaces.

EXAMPLE 2

A polyurethane gel is produced from a mixture of 95.85 g of a polyether alcohol of molar mass 3000 based on glycerol and propylene oxide, hydroxyl number 55.5 mg KOH/g, from 39.15 g of a polyether alcohol of molar mass 420 based on glycerol and propylene oxide, hydroxyl number 402 mg KOH/g, 0.48 g of N-methyldicyclohexylamine, 2.7 g of nanoscale montmorillonite, which are first premixed at 25° C. for 30 minutes, and a partly trimerized isocyanate which has been prepared from 116.7 g of 4,4'-dicyclohexylmethyl diisocyanate and 8.7 g of 2,4-tolylene diisocyanate in the presence of 0.175 g of tris-1,3,5-(diethylaminopropyl)hexahydro-s-triazine, by mixing by means of a 2-component low-pressure machine and casting in molds. The polyurethane gel obtained has a Shore A hardness of 77, a breakdown voltage of 72 kV/mm and very good adhesion between the surfaces.

EXAMPLE 3 a) Preparation of an Oligourea Dispersion in a Polyether Alcohol

A mixture of 255 g of dipropylene glycol and 45 g of di-n-butylamine is heated in a 1.5 l four-neck flask to 160° C. while stirring under a nitrogen blanket. On attainment of the temperature, 700 g of flakes of a flexible polyurethane slabstock foam are added within 55 minutes. In the course of this, the temperature is increased slowly to 210° C. On completion of the addition, the mixture is stirred at 210° C. for another 30 minutes. Subsequently, the reaction product is transferred to a vacuum rotary evaporator, and the majority of the dipropylene glycol and excess low boilers is distilled off at 130° C./1 mm. After cooling, 835 g of a dispersion polyol of hydroxyl number 76.7 mg KOH/g are obtained with a particle size of the oligourea particles of 5 µm to 130 µm.

b) Production of the Inventive Polyurethane Gel

A mixture of 75.85 g of the polyether alcohol with dispersed oligourea particles, 39.15 g of a polyether alcohol of molar mass 420 based on glycerol and propylene oxide, hydroxyl number 402 mg KOH/g, 0.3 g of N-methyldicyclohexylamine and 2.05 g of nanoscale montmorillonite, which are first premixed at 25° C. for 30 minutes, and a partly trimerized isocyanate which has been prepared from 94.5 g of 4,4'-dicyclohexylmethyl diisocyanate and 7.3 g of 2,4-tolylene diisocyanate in the presence of 0.165 g of tris-1,3,5-(diethylaminopropyl)hexahydro-s-triazine, is used to produce the inventive polyurethane gel by mixing by means of a 2-component low-pressure machine and casting in molds. The polyurethane gel obtained has a Shore A hardness of 50, a breakdown resistance of 620 kV/mm and very good adhesion between the surfaces.

EXAMPLE 4

A polyurethane gel is produced from a mixture of 95.85 g of a polyether alcohol of molar mass 3000 based on glycerol and propylene oxide, hydroxyl number 55.5 mg KOH/g, from 39.15 g of a polyether alcohol of molar mass 420 based on glycerol and propylene oxide, hydroxyl number 402 mg KOH/g, 0.48 g of N-methyldicyclohexylamine, 7.2 g of micronized melamine cyanurate and 1.97 g of sheet silicate, which are first premixed at 25° C. for 30 minutes, and a partly trimerized isocyanate which has been prepared from 116.7 g of 4,4'-dicyclohexylmethyl diisocyanate and 8.7 g of 2,4-tolylene diisocyanate in the presence of 0.175 g of tris-1,3,5-(diethylaminopropyl)hexahydro-s-triazine, by mixing by means of a 2-component low-pressure machine and casting in molds. The polyurethane gel obtained has a Shore A hardness of 55, a breakdown resistance of 54 kV/mm and very good adhesion between the surfaces. The fire performance thereof was determined via the oxygen index (LOI method) and was 25.3.

EXAMPLE 5

A polyurethane gel is produced from a mixture of 95.85 g of a polyether alcohol of molar mass 3000 based on glycerol and propylene oxide, hydroxyl number 55.5 mg KOH/g, from 39.15 g of a polyether alcohol of molar mass 420 based on glycerol and propylene oxide, hydroxyl number 402 mg KOH/g, 0.48 g of N-methyldicyclohexylamine, 4.5 g of molybdenum disulfide and 1.5 g of sheet silicate, which are first premixed at 25° C. for 30 minutes, and are partly trimerized isocyanate which has been prepared from 116.7 g of 4,4'-dicyclohexylmethyl diisocyanate and 8.7 g of 2,4-tolylene diisocyanate in the presence of 0.175 g of tris-1,3,5-(diethylaminopropyl)hexahydro-s-triazine, by mixing by means of a 2-component low-pressure machine and casting in molds. The polyurethane gel obtained has a Shore A hardness of 60, a breakdown resistance of 98 kV/mm, a surface conductivity of 310 mS/cm and a specific resistivity of 800 Ω/cm.

EXAMPLE 6

A polyurethane gel is produced from a mixture of 95.85 g of a polyether alcohol of molar mass 3000 based on glycerol and propylene oxide, hydroxyl number 55.5 mg KOH/g, from 39.15 g of a polyether alcohol of molar mass 420 based on glycerol and propylene oxide, hydroxyl number 402 mg KOH/g, 0.48 g of N-methyldicyclohexylamine, 6.65 g of micronized silicon carbide and 2.15 g of sheet silicate, which are first premixed at 25° C. for 30 minutes, and a partly trimerized isocyanate which has been prepared from 116.7 g of 4,4'-dicyclohexylmethyl diisocyanate and 8.7 g of 2,4-tolylene diisocyanate in the presence of 0.175 g of tris-1,3,5-(diethylaminopropyl)hexahydro-s-triazine, by mixing by means of a 2-component low-pressure machine and casting in molds. The polyurethane gel obtained has a Shore A hardness of 65, a breakdown resistance of 130 kV/mm and a thermal conductivity of 3.67 W/Km$^2$.

EXAMPLE 7

A polyurethane gel is produced from a mixture of 95.85 g of a polyether alcohol of molar mass 3000 based on glycerol and propylene oxide, hydroxyl number 55.5 mg KOH/g, from 25.5 g of a polyether alcohol of molar mass 420 based on glycerol and propylene oxide, hydroxyl number 402 mg KOH/g, 16.5 g of an aromatic polyester alcohol based on terephthalic acid, 2-ethyl-1,3-hexanediol and glycerol having a hydroxyl number of 319 mg KOH/g and a hydroxyl functionality of 2.14, 0.55 g of N-methyldicyclohexylamine, which are first premixed at 25° C. for 30 minutes, and a partly trimerized isocyanate which has been prepared from 116.7 g of 4,4'-dicyclohexylmethyl diisocyanate and 8.7 g of 2,4-tolylene diisocyanate in the presence of 0.175 g of tris-1,3,5-

(diethylaminopropyl)hexahydro-s-triazine, by mixing by means of a 2-component low-pressure machine and casting in molds. The polyurethane gel obtained has a Shore A hardness of 80, and very good adhesion to a polystyrene surface, such that the bond between the two is possible only with destruction of one material.

EXAMPLE 8 a) Production of a Nanoscale Oligourea Dispersion in a Polyether Alcohol

A mixture of 255 g of dipropylene glycol and 45 g of di-n-butylamine is heated in a 1.5 l four-neck flask to 160° C. while stirring under a nitrogen blanket. On attainment of the temperature, 700 g of flakes of a flexible polyurethane slabstock foam and simultaneously 78 g of a propylene oxide-based polyether alcohol of hydroxyl number 55.5 mg KOH/g are added within 55 minutes. In the course of this, the temperature is increased slowly to 210° C. On completion of the addition, the mixture is stirred at 210° C. for another 30 minutes. Subsequently, the reaction product is transferred to a vacuum rotary evaporator, and the majority of the dipropylene glycol and excess low boilers is distilled off at 120° C./1 mm. After cooling, 896 g of a dispersion polyol of hydroxyl number 73.2 mg KOH/g are obtained with a particle size of the oligourea particles of 110 to 850 nm.

b) Production of the Inventive Polyurethane Gel

A mixture of 78.0 g of the polyether alcohol with dispersed oligourea nanoparticles, 39.15 g of a polyether alcohol of molar mass 420 based on glycerol and propylene oxide, hydroxyl number 402 mg KOH/g, 0.3 g of N-methyldicyclohexylamine and 2.05 g of nanoscale montmorillonite, which are first premixed at 25° C. for 30 minutes, and a partly trimerized isocyanate which have been prepared from 94.5 g of 4,4'-dicyclohexylmethyl diisocyanate and 7.3 g of 2,4-tolylene diisocyanate in the presence of 0.165 g of tris-1,3,5-(diethyl-aminopropyl)hexahydro-s-triazine, is used to produce the inventive polyurethane gel by mixing by means of a 2-component low-pressure machine and casting in molds. The polyurethane gel obtained has a Shore A hardness of 45, a breakdown resistance of 122 kV/mm and very good adhesion between the surfaces.

EXAMPLE 9

A polyurethane gel is produced from a mixture of 95.85 g of a polyether alcohol of molar mass 3000 based on the glycerol and propylene oxide, hydroxyl number 55.5 mg KOH/g, from 25.5 g of polyether alcohol of molar mass 420 based on glycerol and propylene oxide, hydroxyl number 402 mg KOH/g, 16.5 g of an aromatic polyester alcohol based on terephthalic acid, 2-ethyl-1,3-hexanediol and glycerol having a hydroxyl number of 319 mg KOH/g and a hydroxyl functionality of 2.14, 0.55 g of N-methyldicyclohexylamine and 16.2 g of a high-viscosity transformer oil (viscosity at 25° C. 980 mPas), which are first premixed at 25° C. for 30 minutes, and a partly trimerized isocyanate which has been prepared from 105 g of 4,4'-dicyclohexylmethyl diisocyanate and 9 g of 2,4-tolylene diisocyanate in the presence of 0.18 g of tris-1,3,5-(diethylaminopropyl)hexahydro-s-triazine, by mixing by means of a 2-component low-pressure machine and casting in molds. The polyurethane gel obtained has a Shore A hardness of 63, tear propagation resistance >30 N/mm, and a breakdown voltage of 116 kV/mm and has a specific resistivity of $8*10^{14}$ Ω×cm. The bond strength of the two gel layers is such that the bond between the two is possible only with destruction of one of the gels. The light arc stability is 280 s, the dielectric constant is 3.4 $\epsilon_r$, and a loss factor of <0.0035 tan δ.

EXAMPLE 10

A polyurethane gel is produced from a mixture of 95.85 g of a polyether alcohol of molar mass 3000 based on glycerol and propylene oxide, hydroxyl number 55.5 mg KOH/g, from 25.5 g of a polyether alcohol of molar mass 420 based on glycerol and propylene oxide, hydroxyl number 402 mg KOH/g, 15 g of an epoxidized soybean oil having an epoxy number of 63 mg KOH/g, 0.55 g of N-methyldicyclohexylamine, which are first premixed at 25° C. for 30 minutes, and a partly trimerized isocyanate which has been prepared from 75 g of 4,4'-dicyclohexylmethyl diisocyanate and 7.2 g of 2,4-tolylene diisocyanate in the presence of 0.14 g of tris-1,3,5-(diethylaminopropyl)hexahydro-s-triazine, by mixing by means of a 2-component low-pressure machine and casting in molds. The polyurethane gel obtained has a Shore A hardness of 51. After production, the inventive polyurethane gel is a compact block which, however, deforms under mechanical stress and liquefies under sufficient external force. The gel has thixotropic properties and is used for lubrication of high-speed machine parts, at sites which would rapidly run dry with liquid lubricants.

The invention claimed is:

1. A polyurethane gel producible by conversion of a polyurethane system wherein;
   (A1) one or more polyether alcohols which have been prepared predominantly from propylene oxide added onto a starter molecule of hydroxyl functionality from 2 to 4 and have a hydroxyl number of 28 to 90 mg KOH/g,
   (A2) one or more polyether alcohols which have been prepared predominantly from propylene oxide added onto a starter molecule of hydroxyl functionality from 2 to 4 and have a hydroxyl number of 240 to 850 mg KOH/g,
   (B1) one or more diisocyanates,
   (B2) one or more triisocyanates which have preferably been prepared by trimerization of diisocyanates,
   (A3) at least one additive which fulfills a given function and
   (A4) at least one additive of montmorillonite type sheet silicates having a particle size in the range from 1 to 650 nm in the presence of one or more catalysts (A5) for polyurethane formation,
wherein the polyether alcohol (A1) present is an oligourea-containing long-chain polyether alcohol in which the oligoureas are obtained by depolymerization of flexible polyurethane slabstock foams by solvolysis with a mixture of at least one glycols and at least one secondary aliphatic amine, in an amount of 0.1 to 25% by weight, and has a particle diameter of 1 to 1000 μm, or with a mixture of at least two glycols and at least one secondary aliphatic amine, in an amount of 0.1 to 15% by weight, and has a particle diameter of 1 to 1000 nm.

2. The polyurethane gel as claimed in claim 1, wherein the polyether alcohol (A1) present is a polyether alcohol which has been grafted onto a di- to tetrafunctional starter exclusively with propylene oxide and has a hydroxyl number in the range of 44 to 90 mg KOH/g.

3. The polyurethane gel as claimed in claim 1, wherein the polyether alcohol (A2) present is a polyether alcohol which has been grafted onto a di- to tetrafunctional starter exclusively with propylene oxide and has a hydroxyl number in the range of 350 to 850 mg KOH/g.

4. The polyurethane gel as claimed in claim 1, wherein the polyether alcohol (A2) present is a polyether alcohol which has been grafted onto a di- to tetrafunctional starter exclusively with the propylene oxide and polyether ester which has been reacted with an aliphatic discarboxylic acid in deficiency, and has a hydroxyl number in the range of 340 to 420 mg KOH/g.

5. The polyurethane gel as claimed in claim 1, wherein the triisocyanate (B2) present is a partly trimerized mixture of aliphatic, araliphatic and/or cycloaliphatic, and at least one aromatic, diisocyanate.

6. The polyurethane gel as claimed in claim 1, wherein the aromatic diisocyanate (B2) is present in the mixture at 1 to 15% by weight.

7. The polyurethane gel as claimed in claim 1, wherein the catalysts (A5) present are bis(dimethylaminoethyl) ether, pentamethyl-diethylenetriamine, dimorpholinodiethyl ether, tris(3-dimethylamino)propyl-amine, pentamethylpropylenetriamine, N-methyldicyclohexylamine, N-methylmorpholine, N,N'-dimethylpiperazine and/or 1-dimethylaminoethyl-4-methylpiperazine.

8. The polyurethane gel as claimed in claim 1, wherein the polyurethane system comprises
- (A1.1) 40 to 60 parts of a polyether alcohol which has been prepared predominantly from propylene oxide added onto a starter molecule of hydroxyl functionality from 2 to 4 and has a hydroxyl number of 44 to 90 mg KOH/g,
- (A2.1) 30 to 15 parts of a polyether alcohol which has been prepared predominantly from propylene oxide added onto a starter molecule of hydroxyl functionality from 2 to 4 and has a hydroxyl number of 320 to 450 mg KOH/g,
- (B1.1) 25 to 42 parts of one or more diisocyanates,
- (B2.1) 5 to ..parts of a triisocyanate prepared preferably by trimerization of diisocyanates,
- (A5.1) 0.001 to 0.5 part of one or more catalysts for polyurethane formation, and additionally comprises
- (A3.1) 0.1 to 15 parts of a substance which improves thermal conductivity in micronized form, preferably silicon carbide or graphite having particle diameters in the range from 0.1 to 500 μm, and
- (A4.1) 0.01 to 5 parts of a nanoscale montmorillionite-type sheet silicate having a particle size in the range from 50 to 650 nm.

9. The polyurethane gel as claimed in claim 1, wherein the polyurethane system comprises
- (A1.1) 40 to 60 parts of a polyether alcohol which has been prepared predominantly from propylene oxide added onto a starter molecule of hydroxyl functionality from 2 to 4 and has a hydroxyl number of 44 to 90 mg KOH/g,
- (A2.1) 30 to 15 parts of a polyether alcohol which has been prepared predominantly from propylene oxide added onto a starter molecule of hydroxyl functionality from 2 to 4 and has a hydroxyl number of 320 to 450 mg KOH/g,
- (B1.1) 25 to 42 parts of one or more diisocyanates,
- (B2.1) 5 to 15 parts of a triisocyanate prepared preferably by trimerization of diisocyanates,
- (A5.1) 0.001 to 0.5 part of one or more catalysts for polyurethane formation, and additionally comprises
- (A3.2) 0.1 to 15 parts of a substance which improves electrical conductivity in micronized form, preferably iodine-treated carbon, graphite or molybdenum sulfide having particle diameters in the range from 0.1 to 500 μm, and
- (A4.1) 0.01 to 5 parts of a nanoscale sheet montmorillionite-type silicate having a particle size in the range from 50 to 650 nm.

10. The polyurethane gel as claimed in claim 1, wherein the polyurethane system comprises
- (A1.1) 40 to 60 parts of a polyether alcohol which has been prepared predominantly from propylene oxide added onto a starter molecule of hydroxyl functionality from 2 to 4 and has a hydroxyl number of 44 to 90 mg KOH/g,
- (A2.1) 30 to 15 parts of a polyether alcohol which has been prepared predominantly from propylene oxide added onto a starter molecule of hydroxyl functionality from 2 to 4 and has a hydroxyl number of 320 to 450 mg KOH/g,
- (B1.1) 25 to 42 parts of one or more diisocyanates,
- (B2.1) 5 to 15 parts of a triisocyanate prepared preferably by trimerization of diisocyanates,
- (A5.1) 0.001 to 0.5 part of one or more catalysts for polyurethane formation, and additionally comprises
- (A3.3) 1 to 15 parts of a liquid, pasty or gel-type, relatively high molecular weight hydrocarbon with high electrical insulation capacity, preferably a mineral oil or Vaseline, and
- (A4.1) 0.01 to 5 parts of a nanoscale montmorillionite-type sheet silicate having a particle size in the range from 50 to 650 nm.

11. The polyurethane gel as claimed in claim 1, wherein the polyurethane system comprises
- (A1.1) 40 to 60 parts of a polyether alcohol which has been prepared predominantly from propylene oxide added onto a starter molecule of hydroxyl functionality from 2 to 4 and has a hydroxyl number of 44 to 90 mg KOH/g,
- (A2.1) 30 to 15 parts of a polyether alcohol which has been prepared predominantly from propylene oxide added onto a starter molecule of hydroxyl functionality from 2 to 4 and has a hydroxyl number of 320 to 450 mg KOH/g,
- (B1.1) 25 to 42 parts of one or more diisocyanates,
- (B2.1) 5 to 15 parts of a triisocyanate prepared preferably by trimerization of diisocyanates,
- (A5.1) 0.001 to 0.5 part of one or more catalysts for polyurethane formation, and additionally comprises
- (A3.4) 2.5 to 15 parts of a substance which improves flame retardancy in micronized form, preferably melamine, melamine cyanurate, melamine-formaldehyde resin, urea-formaldehyde resin and/or polycyanurate resin having particle diameters in the range from 0.1 to 500 μm, and
- (A4.1) 0.01 to 5 parts of a nanoscale montmorillionite-type sheet silicate having a particle size in the range from 50 to 650 nm.

12. The polyurethane gel as claimed in claim 1, wherein the polyurethane system comprises
- (A1.1) 40 to 60 parts of a polyether alcohol which has been prepared predominantly from propylene oxide added onto a starter molecule of hydroxyl functionality from 2 to 4 and has a hydroxyl number of 44 to 90 mg KOH/g,
- (A2.1) 30 to 15 parts of a polyether alcohol which has been prepared predominantly from propylene oxide added onto a starter molecule of hydroxyl functionality from 2 to 4 and has a hydroxyl number of 320 to 450 mg KOH/g,
- (A6) 3 to 18 parts of an aliphatic-aromatic polyester alcohol of hydroxyl number 180 to 320 mg KOH/g with aromatics content 2 to 23% by weight,
- (B1.1) 25 to 42 parts of one or more diisocyanates, (B2.1) 5 to 15 parts of a triisocyanate prepared preferably by trimerization of diisocyanates,
(A5.1) 0.001 to 0.5 part of one or more catalysts for polyurethane formation, and additionally comprises
(A3.5) 0.1 to 5 parts of a modified native oil and
(A4.1) 0.01 to 5 parts of a nanoscale montmorillionite-type sheet silicate having a particle size in the range from 50 to 650 nm.

13. The polyurethane gel as claimed in claim 1, wherein the polyurethane system comprises
    (A1.2) 40 to 60 parts of a polyether alcohol which has been prepared predominantly from propylene oxide added onto a starter molecule of hydroxyl functionality from 2 to 4 and has a hydroxyl number of 44 to 90 mg KOH/g with in the range from 2 to 15% by weight of dispersed oligoureas of particle size 10 to 1000 μm,
    (A2.2) 25 to 10 parts of a polyether alcohol which has been prepared predominantly from propylene oxide added onto a starter molecule of hydroxyl functionality from 2 to 4 and has a hydroxyl number of 320 to 450 mg KOH/g,
    (B1.1) 25 to 42 parts of one or more diisocyanates,
    (B2.1) 5 to 15 parts of a triisocyanate prepared preferably by trimerization of diisocyanates,
    (A5.1) 0.001 to 0.5 part of one or more catalysts for polyurethane formation, and additionally comprises
    (A3.5) 0.1 to 5 parts of a modified native oil and
    (A4.1) 0.01 to 5 parts of a nanoscale montmorillionite-type sheet silicate having a particle size in the range from 50 to 650 nm.

14. The polyurethane gel as claimed in claim 1, wherein the polyurethane system comprises
    (A1.2) 40 to 60 parts of a polyether alcohol which has been prepared predominantly from propylene oxide added onto a starter molecule of hydroxyl functionality from 2 to 4 and has a hydroxyl number of 44 to 90 mg KOH/g with in the range from 2 to 15% by weight of dispersed oligoureas of particle size 10 to 1000 nm,
    (A2.2) 25 to 10 parts of a polyether alcohol which has been prepared predominantly from propylene oxide added onto a starter molecule of hydroxyl functionality from 2 to 4 and has a hydroxyl number of 320 to 450 mg KOH/g,
    (B1.1) 25 to 42 parts of one or more diisocyanates,
    (B2.2) 2.5 to 10 parts of a triisocyanate prepared preferably by trimerization of diisocyanates,
    (A5.1) 0.001 to 0.5 part of one or more catalysts for polyurethane formation, and additionally comprises
    (A4.1) 0.01 to 5 parts of a nanoscale montmorillionite-type sheet silicate having a particle size in the range from 50 to 650 nm.

15. A process for producing polyurethane gels as claimed in claim 1, wherein
    (A1) a polyether alcohol of hydroxyl number 28 to 90 mg KOH/g composed of one or more, predominantly from onto a starter molecule of hydroxyl functionality from 2 to 4 added propylene oxide,
    (A2) a polyether alcohol of hydroxyl number 240 to 850 mg KOH/g composed of one or more, predominantly from onto a starter molecule of hydroxyl functionality from 2 to 4 added propylene oxide,
    (A5) one or more catalysts for polyurethane formation,
    (A3) at least one additive which fulfills a given function and
    (A4) at least one additive of montmorillonite-type sheet silicates having a particle size in the range from 1 to 650 nm
    are mixed intimately with one another and then mixed with
    (B1) one or more diisocyanates,
    (B2) one or more triisocyanates which have preferably been prepared by trimerization of diisocyanates,
    in an OH:NCO molar ratio of 1:0.5 to 1:1.2, and converted to a polyurethane gel having a Shore A hardness in the range from 35 to 85.

16. The process as claimed in claim 15, wherein the polyether alcohol (A1) used is an oligourea-containing long-chain polyether alcohol in which the oligoureas are obtained by depolymerization of flexible polyurethane slabstock foams by solvolysis with a mixture of at least two glycols and at least one secondary aliphatic amine, are present in an amount of 0.1 to 25% by weight, and have a particle diameter of 1 to 1000 μm.

17. The process as claimed in claim 15 wherein
    (A1.1) 40 to 60 parts of a polyether alcohol which has been prepared predominantly from propylene oxide added onto a starter molecule of hydroxyl functionality from 2 to 4 and has a hydroxyl number of 44 to 90 mg KOH/g,
    (A2.1) 30 to 15 parts of a polyether alcohol which has been prepared predominantly from propylene oxide added onto a starter molecule of hydroxyl functionality from 2 to 4 and has a hydroxyl number of 320 to 450 mg KOH/g,
    (A5.1) 0.001 to 0.5 part of one or more catalysts for polyurethane formation,
    (A3.1) 0.1 to 15 parts of a substance which improves thermal conductivity in micronized form, preferably silicon carbide, graphite or molybdenum sulfide having particle diameters in the range from 0.1 to 500 μm, and
    (A4.1) 0.01 to 5 parts of a nanoscale montmorillionite-type sheet silicate having a particle size in the range from 50 to 650 nm
    are mixed intimately, and the following are added to this mixture:
    (B1.1) 25 to 42 parts of one or more diisocyanates,
    (B2.1) 5 to 15 parts of a triisocyanate prepared preferably by trimerization of diisocyanates,
    and this mixture in turn is mixed intimately, subjected to shaping and cured while being shaped.

18. The process as claimed in claim 15 wherein
    (A1.1) 40 to 60 parts of a polyether alcohol which has been prepared predominantly from propylene oxide added onto a starter molecule of hydroxyl functionality from 2 to 4 and has a hydroxyl number of 44 to 90 mg KOH/g,
    (A2.1) 30 to 15 parts of a polyether alcohol which has been prepared predominantly from propylene oxide added onto a starter molecule of hydroxyl functionality from 2 to 4 and has a hydroxyl number of 320 to 450 mg KOH/g,
    (A5.1) 0.001 to 0.5 part of one or more catalysts for polyurethane formation,
    (A3.2) 0.1 to 15 parts of a substance which improves electrical conductivity in micronized form, preferably iodine-treated carbon, graphite or molybdenum sulfide having particle diameters in the range from 0.1 to 500 μm, and
    (A4.1) 0.01 to 5 parts of a nanoscale montmorillionite-type sheet silicate having a particle size in the range from 50 to 650 nm
    are mixed intimately, and the following are added to this mixture:
    (B1.1) 25 to 42 parts of one or more diisocyanates,
    (B2.1) 5 to 15 parts of a triisocyanate prepared preferably by trimerization of diisocyanates, and this mixture in turn is mixed intimately, subjected to shaping and cured while being shaped.

19. The process as claimed in claim 15 wherein
(A1.1) 40 to 60 parts of a polyether alcohol which has been prepared predominantly from propylene oxide added onto a starter molecule of hydroxyl functionality from 2 to 4 and has a hydroxyl number of 44 to 90 mg KOH/g,
(A2.1) 30 to 15 parts of a polyether alcohol which has been prepared predominantly from propylene oxide added onto a starter molecule of hydroxyl functionality from 2 to 4 and has a hydroxyl number of 320 to 450 mg KOH/g,
(A5.1) 0.001 to 0.5 part of one or more catalysts for polyurethane formation,
(A3.3) 2.5 to 15 parts of a substance which improves flame retardancy in micronized form, preferably melamine, melamine cyanurate, melamine-formaldehyde resin, urea-formaldehyde resin and/or polycyanurate resin having particle diameters in the range from 0.1 to 500 µm, and
(A4.1) 0.1 to 5 parts of a nanoscale montmorillionite-type sheet silicate having a particle size in the range from 50 to 650 nm
are mixed intimately, and the following are added to this mixture:
(B1.1) 25 to 42 parts of one or more diisocyanates,
(B2.1) 5 to 15 parts of a triisocyanate prepared preferably by trimerization of diisocyanates,
and this mixture in turn is mixed intimately, subjected to shaping and cured while being shaped.

20. The process as claimed in claim 15 wherein
(A1.1) 40 to 60 parts of a polyether alcohol which has been prepared predominantly from propylene oxide added onto a starter molecule of hydroxyl functionality from 2 to 4 and has a hydroxyl number of 44 to 90 mg KOH/g,
(A2.1) 30 to 15 parts of a polyether alcohol which has been prepared predominantly from propylene oxide added onto a starter molecule of hydroxyl functionality from 2 to 4 and has a hydroxyl number of 320 to 450 mg KOH/g,
(A5.1) 0.001 to 0.5 part of one or more catalysts for polyurethane formation,
(A6) 3 to 18 parts of an aliphatic-aromatic polyester alcohol of hydroxyl number 180 to 320 mg KOH/g with aromatics content 2 to 23% by weight, and
(A4.1) 0.1 to 5 parts of a nanoscale montmorillionite-type sheet silicate having a particle size in the range from 50 to 650 nm
are mixed intimately, and the following are added to this mixture:
(B1.1) 25 to 42 parts of one or more diisocyanates,
(B2.1) 5 to 15 parts of a triisocyanate prepared preferably by trimerization of diisocyanates,
and this mixture in turn is mixed intimately, subjected to shaping and cured while being shaped.

21. The process as claimed in claim 15 wherein
(A1.1) 40 to 60 parts of a polyether alcohol which has been prepared predominantly from propylene oxide added onto a starter molecule of hydroxyl functionality from 2 to 4 and has a hydroxyl number of 44 to 90 mg KOH/g,
(A2.1) 30 to 15 parts of a polyether alcohol which has been prepared predominantly from propylene oxide added onto a starter molecule of hydroxyl functionality from 2 to 4 and has a hydroxyl number of 320 to 450 mg KOH/g,
(A5.1) 0.001 to 0.5 part of one or more catalysts for polyurethane formation,
(A3.5) 0.1 to 5 parts of a modified native oil and
(A4.1) 0.01 to 5 parts of a nanoscale montmorillionite-type sheet silicate having a particle size in the range from 50 to 650 nm
are mixed intimately, and the following are added to this mixture:
(B1.1) 25 to 42 parts of one or more diisocyanates,
(B2.1) 5 to 15 parts of a triisocyanate prepared preferably by trimerization of diisocyanates,
and this mixture in turn is mixed intimately, subjected to shaping and cured while being shaped.

22. The process as claimed in claim 15 wherein
(A1.2) 40 to 60 parts of a polyether alcohol which has been prepared predominantly from propylene oxide added onto a starter molecule of hydroxyl functionality from 2 to 4 and has a hydroxyl number of 44 to 90 mg KOH/g with in the range from 2 to 15% by weight of dispersed oligoureas of particle size 10 to 1000 nm,
(A2.2) 25 to 10 parts of a polyether alcohol which has been prepared predominantly from propylene oxide added onto a starter molecule of hydroxyl functionality from 2 to 4 and has a hydroxyl number of 320 to 450 mg KOH/g,
(A5.1) 0.001 to 0.5 part of one or more catalysts for polyurethane formation,
(A4.1) 0.01 to 5 parts of a nanoscale montmorillionite-type sheet silicate having a particle size in the range from 50 to 650 nm
are mixed intimately, and the following are added to this mixture:
(B1.1) 25 to 42 parts of one or more diisocyanates,
(B2.1) 5 to 15 parts of a triisocyanate prepared preferably by trimerization of diisocyanates,
and this mixture in turn is mixed intimately, subjected to shaping and cured while being shaped.

* * * * *